United States Patent Office

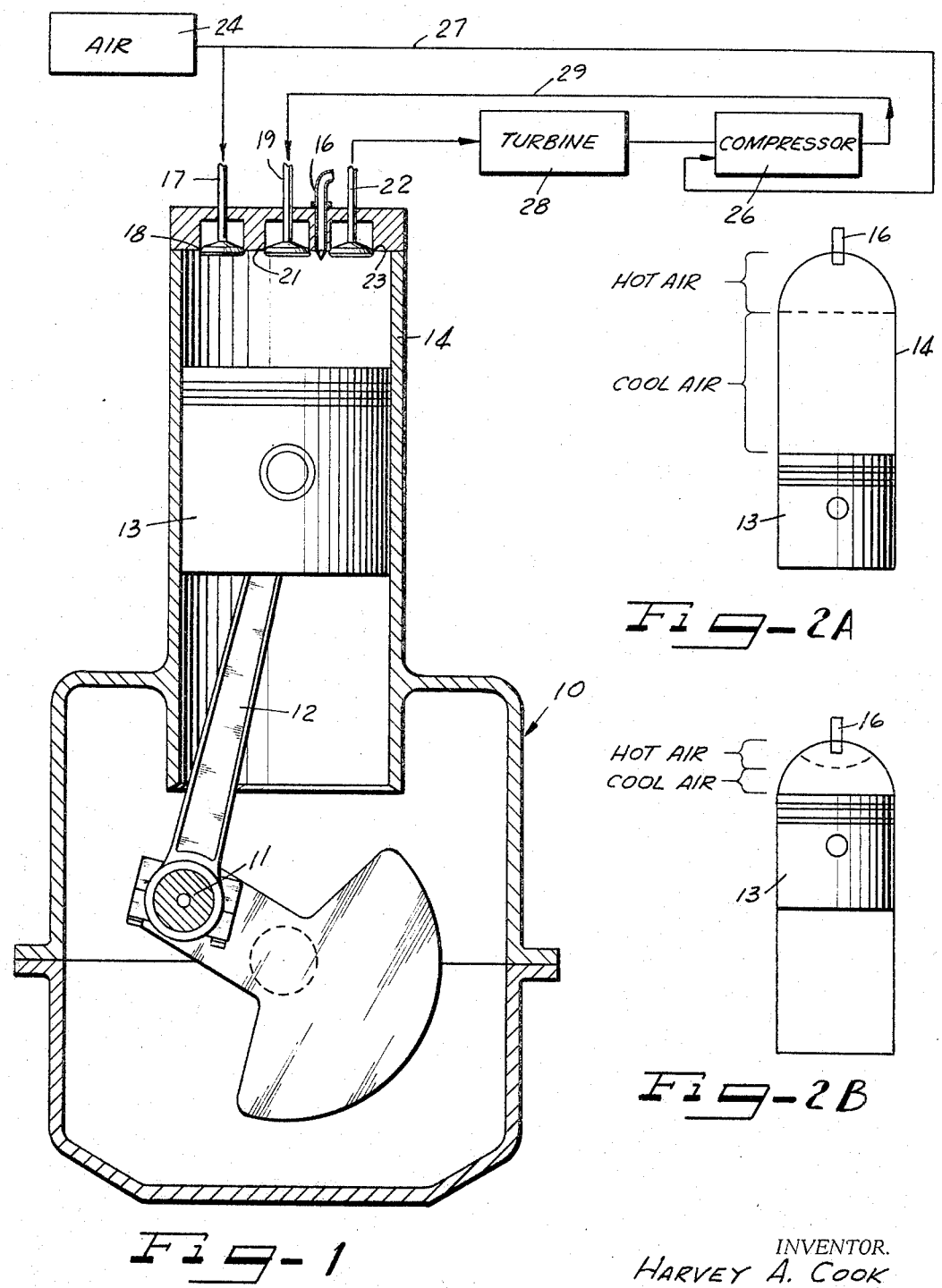

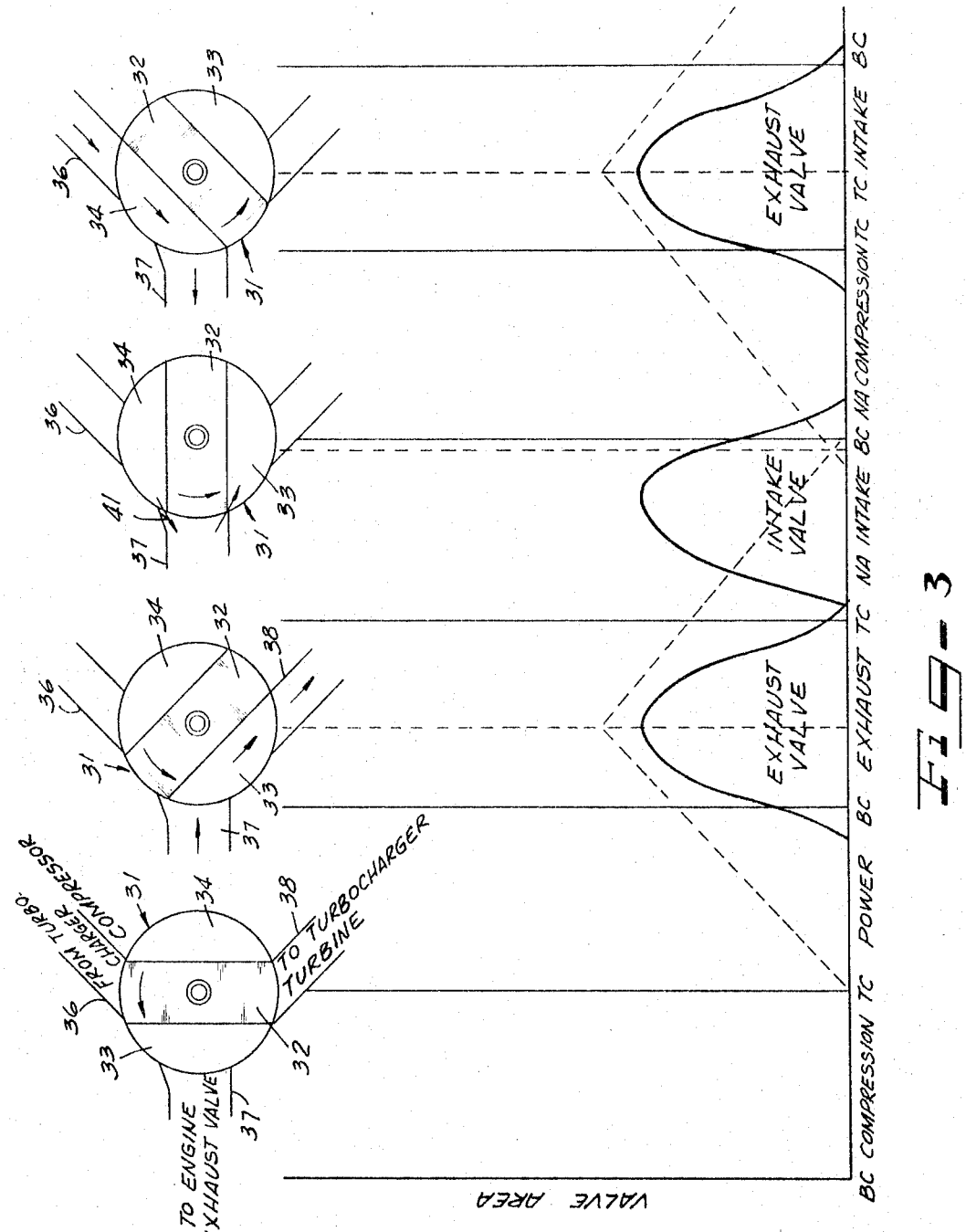

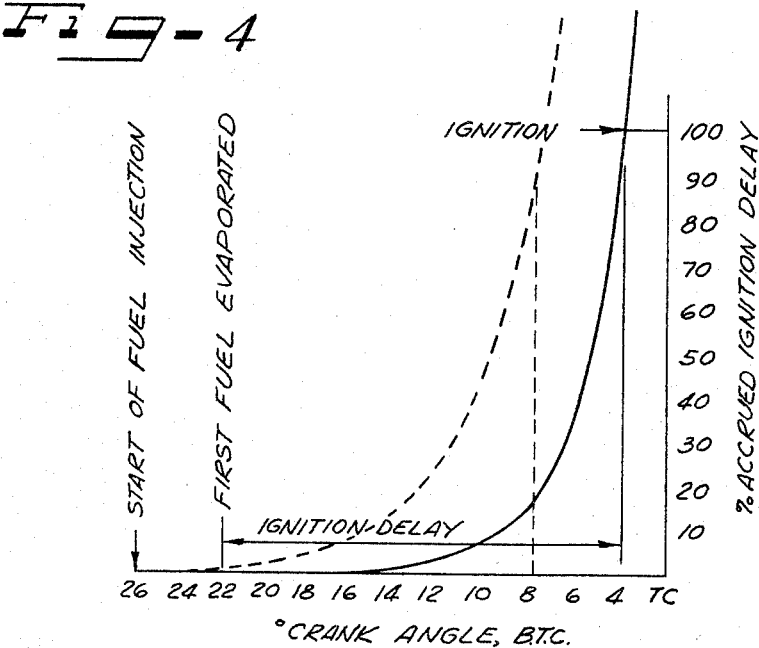
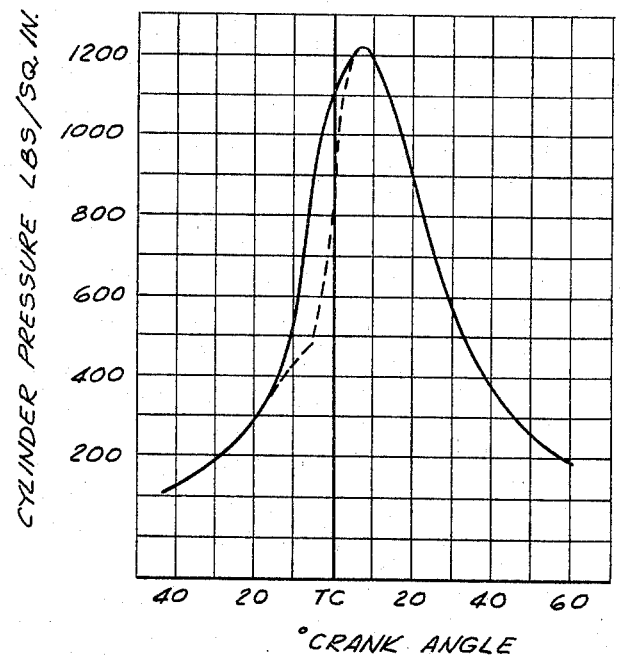

3,266,234
Patented August 16, 1966

3,266,234
COMPRESSION IGNITION ENGINE AND METHOD OF OPERATING SAME
Harvey A. Cook, Cleveland, Ohio, assignor to TRW Inc., a corporation of Ohio
Filed Nov. 13, 1964, Ser. No. 410,992
7 Claims. (Cl. 60—13)

The present invention relates to improvements in the field of compression ignition engines of the multi-fuel or diesel types, and to methods for operating the same more efficiently.

Currently, compression ignition engines use very high compression ratios to achieve satisfactory combustion. Such high compression ratios are undesirable because of the resulting high firing pressures which occur as the power is increased. In addition, high compression ratio engines require heavy engine construction, and specific output and horsepower per pound of engine is accordingly limited, and frictional horsepower is also increased.

The present invention employs what amounts to constant volume turbocharging and incorporates stratified charges of relatively cool and relatively hot air in the cylinder, the relatively hot charge surrounding the fuel injector thereby greatly improving the combustion characteristics.

The type of turbocharging described has the advantage of a controlled turbocharging effect, applying the turbine energy in the form of compressed air during the intake period when it will do the most good, and eliminating the pressurizing of the intake stroke wherein the compressed air would be called upon to do work on the piston. The loss of piston work by elimination of the pressurization during the downward intake stroke of the piston is not a disadvantage because it is normally obtained by an equivalent pressurizing during the exhaust upstroke which provides such energy. The intake air obtained in the downward stroke in a naturally aspirated manner is unheated by the fact that it has not been compressed. This is a decided advantage because the objective is to increase the average density of the trapped charge at the start of the compression stroke, without using excessive pressure to compensate for intake heating by compression.

This type of turbocharging cycle produces a desired average intake trapped charge density increase with an overall greater cycle efficiency than the conventional turbocharging cycle by eliminating the recirculation energy from exhaust to intake in substantially the amount represented by the work of maintaining pressurization of the cylinder during the downward intake stroke of the piston.

Fuel injected into a compression ignition engine with a stratified temperature charge as described previously will be ignited readily since it enters immediately into a highly heated portion, thereby providing an aid to ignition and shortening ignition delay which accounts for rough combustion with fuels having low Cetane ratings. In many respects, the stratified temperature charge generates the same effects in a direct injection engine that are desired in a precombustion chamber type engine but without the physical limitations and structural complications, excessive heat transfer, and throttling losses characteristic of such engines. The stratified temperature charge provides a ready source of ignition without division of the combustion chamber and therefore complete combustion of all the fuel is readily achieved to give efficient heat release with a minimum heat conductivity to the cylinder walls.

It is accordingly an object of the present invention to provide an improved method of operating a compression ignition engine which makes it possible to use lower compression ratios than heretofore employed.

Still another object of the invention is to provide an improved efficiency diesel engine or the like for operation on fuels with low Cetane numbers, while assuring complete combustion of the fuel in the chamber.

Still another object of the invention is to provide a diesel engine or the like which produces a precombustion chamber effect without the physical limitations provided by a precombustion chamber.

Other objects and features of the present invention will become apparent to those skilled in the art from the following description of the attached sheets of drawings in which:

FIGURE 1 is a view, partly schematic, of a compression ignition engine embodying the improvements of the present invention;

FIGURES 2A and 2B are schematic representations of the temperature stratification effects which exist in the cylinder during compression;

FIGURE 3 is a schematic view of a six stroke turbocharged engine, illustrating the timing involved between the rotary valve and the exhaust and intake valves of the engine;

FIGURE 4 is a graph plotting percent accrued ignition delay against degrees of crank angle; and FIGURE 5 is a graph comparing the cylinder pressures in the engine against crank angle for conventional engines and those incorporating the improved temperature stratification technique of the present invention.

As shown in the drawings:

In FIGURE 1, reference numeral 10 indicates generally a crank case in which there is a crank shaft 11 about which is connected a piston rod 12 in the usual manner. A piston 13 is secured to the opposite end of the piston rod 12, and is reciprocable within a cylinder 14. A fuel injection nozzle 16 is disposed in the head of the cylinder 14 to spray liquid fuel into the cylinder at the appropriate time in the cycle to initiate the power stroke. A first inlet valve 17 is arranged to be seated in a valve seat 18 formed in the head of the cylinder, and a second inlet valve 19 is also arranged to be seated in its associated seat 21. An exhaust valve 22 is also carried by the cylinder head and is arranged to be seated on a valve seat 23 therein.

Ambient air is introduced periodically into the cylinder 14 to serve as a cold air charge, and may be drawn, for example, from an air manifold generally indicated at reference numeral 24 in the drawings. The same manifold 24 feeds air into a compressor 26 through a line 27, the compressor 26 being part of a turbocharging system as will hereinafter appear.

The exhaust valve 22, upon opening, discharges combustion gases to drive a turbine 28 which, in turn, drives the compressor 26. The compression of the air serves to heat it substantially above the temperature of the ambient air entering through the first inlet valve 17. The heated air is introduced into the cylinder through the second inlet valve 19 by means of a line 29.

The operation of the engine can best be described in conjunction with the schematic showings of FIGURES 2A and 2B. The showing of FIGURE 2A illustrates the conditions momentarily existing at the time the piston 13 reaches bottom dead center (BC). At this time, the cylinder 14 has stratified charges of air consisting of a relatively large cool air mass and a relatively small hot air mass immediately above it. This stratification is produced by opening the valve 17 initially, followed by an opening of the valve 19 for a short interval to introduce the relatively hot air from the compressor 26. The time intervals involved are so short that there is no appreciable intermixing or diffusion of the hot and cold air masses from the time the two charges are introduced into the cylinder 14 to the time the piston 13 reaches its top dead center position (TC) as illustrated in FIGURE 2B. The compression of the stratified masses of air, consisting of the relatively dense cool air mass and the relatively light hot air mass confines the hot air mass about the fuel spray injector 16, as illustrated rather schematically in FIGURE 2B. The compression of the masses serves to raise their temperature, and theoretically both are heated in the same ratio. Therefore, the small portion of the charge that is initially hot acts as a source of pilot ignition because of its much higher temperature after compression. This stratified heating is controlled so that the pilot ignition process is maintained down to the lowest ambient temperature at which the engine will be used. In this way, controlled heating of a small part of the intake charge is substituted for the high compression ratio would otherwise be needed.

A further embodiment of the present invention is shown rather schematically in FIGURE 3 of the drawings. This embodiment consists of a stratified temperature turbocharged six stroke cycle engine and includes an intake valve for introducing normally aspirated air (NA), an exhaust valve which serves the normal exhaust function as well as serving as an inlet to the cylinder for turbocharged air, and a rotary valve identified at reference numeral 31. As illustrated in FIGURE 3, the rotary valve 31 has a central valve portion 32 and opposed relieved areas 33 and 34 on opposite sides thereof. The rotary valve 31 serves to selectively communicate the discharge from the turbocharger compressor through a line 36 with the engine exhaust valve through a line 37. The combustion gases from the engine are also arranged to be discharged from the line 37 to a line 38 leading to the turbocharger turbine.

In the top dead center position, the rotary valve 31 has the position shown at the extreme left of FIGURE 3. In this condition of the engine, the rotary valve is completely closed, and the exhaust and intake valves are also closed. At the beginning of the power stroke, the rotary valve 31 starts to open, the relative amount of exposed area being represented by the dashed line in FIGURE 3. Shortly before the piston reaches bottom dead center, the exhaust valve starts to open, beginning the exhausting of combustion gases from the line 37 to the line 38 and then into the turbocharger intake. Eventually, the condition is reached as illustrated in the second view of FIGURE 3 where the exhaust valve is completely open, and the relieved area 33 provides complete communication between the line 37 and the line 38. The exhaust cycle then continues, with the exhaust valve closing substantially at top dead center position, whereupon the intake valve begins to open to aspirate ambient air into the cylinder. Eventually, the rotary valve reaches the position shown in the third of the views of FIGURE 3 where it is in line with the line 37. As illustrated, the line 37 is provided with a slight outward flare as indicated at 41 to provide for scavenging of the ports by means of hot air from the turbocharger compressor.

When the intake valve closes, so that both the intake and exhaust valves are closed, the piston then moves upwardly in the cylinder and compresses the ambient air introduced thereto to turbocharger pressure at which time, the exhaust valve reopens to become the turbocharger intake valve, as illustrated in the extreme right-hand showing of FIGURE 3. This stratified temperature charge is then compressed and fuel is injected into the cylinder at the top dead center position, commencing another power stroke.

The rotary valve, the exhaust port, and the exhaust valve contribute heat to the turbocharger intake air in a manner comparable to a thermally insulated precombustion chamber wall, and not only are these parts aiding thereby in the precombustion chamber action but at the same time they are being cooled. Higher power levels per power stroke can therefore be achieved because exhaust valve temperature does not limit engine power.

FIGURE 4 shows the improvement in control of compress ignition by the use of temperature stratification. In this graph, the percent accrued ignition delay is plotted against the degrees of crank angle, before top dead center. As seen in this graph, the preparation of the fuel for ignition by compression is almost independent of the time of injection as long as the time for the first fuel to evaporate in the cylinder occurs before 16° B.T.C. The time of ignition is therefore not controllable by injection until injection timing is delayed so far that the first fuel evaporates after 16° B.T.C. This means that control of ignition timing by fuel injection is limited to retarding the ignition but the control that is desired is that of advancing the ignition in varying amounts, depending on speed and load on the engine. The technique of temperature stratification moves the solid line representing the accumulated preparedness for burning to the left for the heated zone of the stratified temperature charge (as shown by the dashed line) and the range of control of ignition by varying injection timing is thereby extended to provide the useful range of ignition advance desired.

FIGURE 5 illustrates the variation in cylinder pressure in relation to crank angle, for both the situation where the burning is controlled by temperature stratification (solid line) and where it is not dashed line. It will be seen from this figure that where the burning is controlled by temperature stratification, a smooth pressure rise results whereas with non-controlled ignition delay, there is an accumulation of fuel that produces not only a later ignition but a more rapid pressure rise which makes for rough running.

The graphs of FIGURES 4 and 5 illustrate how extending the control of ignition by temperature stratification can be used to improve engine performance. The time of burning of fuel can be varied in a useful manner by varying the timing of fuel injection when temperature stratification assures that ignition can occur well ahead of top dead center, in contrast to the relatively short time before top dead center that ignition can occur in a non-stratified temperature change.

A normal diesel engine operates on a compression ratio of about 16 to 1. With the temperature stratification of the present invention, this ratio can be reduced to 14 to 1 or as low as 12 to 1, which is just above the compression ratios employed in spark engines. Fuel economy is increased, and increased power is obtainable without exceeding the limiting pressures in the engine.

The amount of preheat can be as low as 50 to 150° F. in order for the improvements of the present invention to occur. The amount of preheated hot air can be very small, and 10 to 20% is a practical range.

It should be evident that various modifications can be made to the described embodiments without departing from the scope of the present invention.

I claim as my invention:

1. The method of operating a compression ignition engine including a cylinder, a piston reciprocable in said cylinder, and a fuel injector delivering fuel to said cylinder which comprises introducing a charge of relatively cool air into said cylinder, shortly thereafter introducing a charge of relatively hot air from outside said cylinder into said cylinders above said charge of cool air to provide stratified air charges of varying temperatures in the cylinder with the hot air charge surrounding said fuel injector, injecting fuel into the stratified charges, and compressing the resulting mixture in said cylinder with said piston to cause ignition of said fuel.

2. The method of operating a compression ignition engine including a cylinder, a piston reciprocable in said cylinder, and a fuel injector delivering fuel to said cylinder which comprises introducing a charge of relatively cool air into said cylinder, shortly thereafter introducing a substantially smaller charge of relatively hot air from outside said cylinder above said charge of cool air to provide stratified air charges of varying temperatures in the cylinder with the hot air charge surrounding said fuel injector, injecting fuel into the stratified charges, and compressing the resulting mixture in said cylinder with said piston to cause ignition of said fuel.

3. The method of operating a compression ignition engine including a cylinder, a piston reciprocable in said cylinder, and a fuel injector delivering fuel to said cylinder which comprises aspirating relatively cool air into said cylinder, providing a heated air charge, outside said cylinder, shortly thereafter introducing said heated air charge into said cylinder above the cool air previously aspirated therein to form stratified air charges in said cylinder with the heated air charge surrounding said fuel injector, injecting fuel into the stratified charges, and compressing the resulting mixture in said cylinder with said piston to cause ignition of said fuel.

4. The method of claim 3 in which said heated air charge is heated by compression.

5. The method of operating a compression ignition engine having a cylinder, a piston reciprocable in said cylinder, an inlet valve arranged to aspirate ambient air into said cylinder and an exhaust valve arranged to vent combustion gases from said cylinder which comprises opening said inlet valve to aspirate ambient air into said cylinder, moving said piston to compress the aspirated charge in said cylinder, directing heated air into said cylinder through said exhaust valve after such compression to form a stratified mixture of relatively hot and relatively cool air charges, recompressing the resulting mixture, injecting fuel into said cylinder in the region of the hot air charge to thereby ignite said fuel, and vending combustion gases through said exhaust valve.

6. The method of claim 5 in which said charge of heated air is delivered from a turbocharger.

7. A compression ignition engine comprising a cylinder, a piston reciprocable in said cylinder, means for injecting fuel into said cylinder, an inlet valve arranged to draw ambient air into said cylinder, an exhaust valve arranged to discharge combustion gases from said cylinder, a turbine receiving the combustion gases discharged through said exhaust valve, a compressor driven by said turbine, and a rotary valve arranged to sequentially (1) direct combustion gases from said exhaust valve to said turbine and (2) direct compressed air from said compressor to said cylinder through said exhaust valve.

References Cited by the Examiner
UNITED STATES PATENTS

| | | | |
|---|---|---|---|
| 1,070,139 | 8/1913 | Kessler | 123—75 X |
| 1,825,817 | 10/1931 | Patterson | 123—75 |
| 1,963,780 | 6/1934 | Du Bois | 123—75 X |
| 2,719,514 | 10/1955 | Schilling | 123—32.4 |
| 2,893,360 | 7/1959 | Mueller | 123—32.4 |

MARK NEWMAN, *Primary Examiner.*

KARL J. ALBRECHT, *Examiner.*